(12) United States Patent
Mizrahi

(10) Patent No.: US 9,912,426 B1
(45) Date of Patent: Mar. 6, 2018

(54) TIME CORRECTION USING EXTENSION FIELDS

(71) Applicant: MARVELL ISRAEL (M.I.S.L) LTD., Yokneam (IL)

(72) Inventor: Tal Mizrahi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 19 days.

(21) Appl. No.: 15/225,398

(22) Filed: Aug. 1, 2016

Related U.S. Application Data

(62) Division of application No. 14/076,403, filed on Nov. 11, 2013, now Pat. No. 9,407,733.

(60) Provisional application No. 61/724,806, filed on Nov. 9, 2012.

(51) Int. Cl.
*H04J 3/06* (2006.01)
*H04L 29/06* (2006.01)

(52) U.S. Cl.
CPC ............ *H04J 3/0635* (2013.01); *H04L 69/22* (2013.01)

(58) Field of Classification Search
CPC .............................. H04L 69/22; H04J 3/0635
USPC ......................................................... 370/474
See application file for complete search history.

(56) References Cited

U.S. PATENT DOCUMENTS

| 5,793,976 | A | * | 8/1998 | Chen | .................. | H04L 43/0852 |
| | | | | | | 370/252 |
| 9,407,733 | B1 | | 8/2016 | Mizrahi | | |
| 2005/0160272 | A1 | | 7/2005 | Teppler | | |
| 2008/0298398 | A1 | * | 12/2008 | Eidson | .................. | H04J 3/0685 |
| | | | | | | 370/503 |
| 2011/0051754 | A1 | * | 3/2011 | Lansdowne | ........... | H04J 3/0673 |
| | | | | | | 370/503 |
| 2011/0087803 | A1 | * | 4/2011 | Sun | ....................... | H04J 3/0673 |
| | | | | | | 709/248 |

FOREIGN PATENT DOCUMENTS

| EP | 2 254 267 | 11/2010 |
| WO | WO 2012/065823 | 5/2012 |

OTHER PUBLICATIONS

IEEE P1588™ D2.2 "Draft Standard for a Precision Clock Synchronization Protocol for Networked Measurement and Control Systems," The Institute of Electrical and Electronics Engineers, Inc., 2008.

(Continued)

*Primary Examiner* — Stephen J Clawson

(57) ABSTRACT

A network device receives a packet that conforms to a protocol that i) defines a time stamp field, ii) does not define a dedicated field for time correction information, and iii) defines a plurality of general purpose extension fields. The packet includes a time stamp generated by a source node in the time stamp field. The network device determines that the packet conforms to the protocol. The network device adds to the packet a new general purpose extension field. The new general purpose extension field specifies time correction information indicating a residence time of the packet in the network device, where the time correction information is for correcting the time specified by the time stamp.

22 Claims, 7 Drawing Sheets

(56) References Cited

OTHER PUBLICATIONS

IEEE Std. 1588™—2008 (Revision of IEEE Std. 1588-2002), "IEEE Standard for a Precision Clock Synchronization Protocol for Networked Measurement and Control Systems," *The Institute for Electrical and Electronics Engineers, Inc.*, IEEE Standard, pp. 1-289 (Jul. 24, 2008).
IEEE P802.1AS/D0.8, "Draft Standard for Local and Metropolitan Area Networks—Timing and Synchronization for Time-Sensitive Applications in Bridged Local Area Networks," The Institute of Electrical and Electronics Engineers, Inc., pp. 1-149 (May 25, 2007).
IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements, "*The Institute of Electrical and Electronics Engineers, Inc.*, pp. 1-196 (Oct. 2004).
IEEE Std. C37.238™—2011, "IEEE Standard Profile for Use of IEEE 1588™ Precision Time Protocol in Power System Applications," *Institute for Electrical and Electronics Engineers, Inc.*, pp. 1-66 (Jul. 2011).
Abdul et al., "Integration of HSR and IEEE1588 over Ethernet networks," Proc. of the 2010 Int'l IEEE Symposium on Precision Clock Synchronization for Measurement, Control and Communication, pp. 77-82 (Sep. 27-Oct. 1, 2010).
Abstract of IEEE 802.1AS Standard, "802.1AS—Timing and Synchronization," *The Institute of Electrical and Electronics Engineers, Inc.*, available at http://www.ieee802.org/1/pages/802.1as.html, 1 page (Mar. 30, 2011).
Alizadeh et al., "DCTCP: Efficient packet transport for the commoditized data center," SIGCOMM, pp. 1-15 (2010).
Appenzeller et al., "Sizing router buffers," SIGCOMM, pp. 1-15 (2004).
Chin et al., "IEEE 1588 Clock Synchronization using Dual Slave Clocks in a Slave," IEEE Communications Letters, vol. 13, No. 6, pp. 456-458 (Jun. 2009).
Corlett et al. "Statistics of One•Way Internet Packet Delays", Internet Engineering Task Force, available at http://tools.ietf.org/id/draft-corlett-statistics-of-packet-delays-00.txt, pp. 1-9 (Aug. 2002).
Gurewitz et al., "Estimating One-Way Delays from Cyclic-Path Delay Measurements," Proc. of Twentieth Annual Joint Conf. of the IEEE Computer and Comm. Societies (IEEE INFOCOM 2001), vol. 2, pp. 1038-1044 (2001).
Gurewitz et al., "One-Way Delay Estimation Using Network Wide Measurements," IEEE Trans. on Information Theory, vol. 52, No. 6, pp. 2710-2724 (2006).
IEC 62439-3, "Industrial communication networks—High availability automation networks—Part 3: Parallel Redundancy Protocol (PRP) and High-availability Seamless Redundancy (HSR)," International Electrotechnical Commission, 2010.
ITU-T Recommendation G.8265.1/Y.1365.1, "Precision time protocol telecom profile for frequency synchronization," *In'l Telecommunication Union*, pp. 1-28 (Oct. 2010).
Lee, "An Enhanced IEEE 1588 Time Synchronization Algorithm for Asymmetric Communication Link Using Block Burst Transmission", IEEE Communications Letters, vol. 12, No. 9, pp. 687-689 (Sep. 2008).
Lv et al., "An Enhanced IEEE 1588 Time Synchronization for Asymmetric Communication Link in Packet Transport Network," IEEE Communications Letters, vol. 14. No. 8. pp. 764-766 (Aug. 2010).
Mills et al., "Network Time Protocol Version 4: Protocol and Algorithms Specification," Request for Comments: 5905, *Internet Engineering Task Force (IETF)*, pp. 1-111 (Jun. 2010).
Mills, "Internet Time Synchronization: The Network Time Protocol," Network Working Group Request for Comments, No. 1129, pp. 1-29 (Oct. 1989).
Mizrahi, "Slave Diversity: Using Multiple Paths to Improve the Accuracy of Clock Synchronization Protocols," 2012 IEEE Int'l Symposium on Precision Clock Synchronization for Measurement, Control, and Communication (ISPCS), pp. 1-6 (Sep. 24, 2012).
Mukherjee, "On the Dynamics and Significance of Low Frequency Components of Internet Load," Internetworking: Research and Experience, vol. 5, No. 4. pp. 163-205 (1992).
Paxson, "End-to-End Internet Packet Dynamics," IEEE/ACM Transactions on Networking, vol. 7(3), pp. 277-292 (Jun. 23, 1997).
Shpiner et al., "Multi-Path Time Synchronization," Internet Engineering Task Force (IETF), Oct. 15, 2012.
Simanic et al., "Compensation of Asymmetrical Latency for Ethernet Clock Synchronization," Proc. of the 2011 Int'l IEEE Symposium on Precision Clock Synchronization for Measurement, Control and Communication (ISPCS), 2011, pp. 19-24 (2011).
Weber et al., "High availability seamless automation ring (Draft IEC 62439-3) and IEEE 1588 time sync dependencies," *Institute for Electrical and Electronics Engineers*, Inc, pp. 1-7 (Oct. 2010).
Zarick et al., "The Impact of Network Latency on the Synchronization of Real-World IEEE 1588-2008 Devices," Proc. of the 2010 Int'l IEEE Symposium on Precision Clock Synchronization for Measurement, Control and Communication, pp. 135-40 (Sep. 27-Oct. 1, 2010).
Zhang et al., "PDV-based PTP LSP Setup, Reoptimization and Recovery," Internet Engineering Task Force, pp. 1-17 (Oct. 2011).

\* cited by examiner

TIME CORRECTION USING EXTENSION FIELDS

CROSS-REFERENCES TO RELATED APPLICATIONS

This disclosure is a divisional of U.S. patent application Ser. No. 14/076,403, entitled "Time Correction Using Extension Fields," filed on Nov. 11, 2013, which claims the benefit of U.S. Provisional Patent Application No. 61/724,806, entitled "Using the NTP Extension Field for Time Correction," filed on Nov. 9, 2012. The disclosures of the applications referenced above are hereby incorporated herein by reference in their entireties.

FIELD OF THE DISCLOSURE

The present disclosure relates generally to devices that maintain a clock and, more particularly, to techniques for synchronizing clocks across a network.

BACKGROUND

Clock synchronization protocols are commonly used in packet-based networks to synchronize the times and frequencies maintained at different network devices. In such clock synchronization protocols, a first network device, which maintains a master clock, transmits a protocol message including a master clock time to a second network device, which maintains a slave clock. The second network device utilizes the master clock time and an estimated network latency to adjust the slave clock in order to synchronize the slave clock with the master clock.

One such clock synchronization protocol is defined by the Institute of Electrical and Electronics Engineers (IEEE) 1588 standard, and is commonly referred to as the "Precision Time Protocol" or "PTP." In PTP, the master clock device generates protocol message packets ("PTP packets") that include a master clock time and a dedicated time correction field defined by the IEEE 1588 standard. When a PTP packet passes through an intermediate node in the communication path between the master and slave clock devices, the intermediate node modifies the dedicated time correction field to indicate an amount of time ("residence time") of the PTP packet within the intermediate node. The slave clock device can then use the master clock time and the contents of the dedicated time correction field to make time adjustment calculations. However, other protocols, such as the "Network Time Protocol" ("NTP") of the Internet Engineering Task Force (IETF), do not define a similar dedicated time correction field.

SUMMARY

In one embodiment, a method for maintaining time at a network device includes receiving, at the network device, a packet that (i) conforms to a protocol that does not define a dedicated field for time correction and (ii) includes a time stamp specifying a time. The method also includes determining, at the network device, whether the received packet includes an existing field specifying time correction information to be used for correcting the time specified by the time stamp, and in response to determining that the packet does not include an existing field specifying time correction information, adding to the packet, at the network device, a new field specifying time correction information to be used for correcting the time specified by the time stamp.

In another embodiment, a network device includes an ingress configured to receive packets from a network, and a time correction field detection unit configured to determine whether a packet that is (i) received via the ingress, and (ii) conforms to a protocol that does not define a dedicated field for time correction, includes an existing field specifying time correction information to be used for correcting a time specified by a time stamp included in the packet. The network device also includes a time maintenance unit configured to, if the time maintenance field detection unit determines that the packet does not include an existing field specifying time correction information, add to the packet a new field specifying time correction information, and configured to, if the time maintenance field detection unit determines that the packet includes an existing field specifying time correction information, update the existing field specifying the time correction information.

In another embodiment, a method for synchronizing time or frequency at a device coupled to a network that includes a plurality of intermediate nodes includes receiving, at the device and from the network, a packet including (i) a time stamp generated by a source node and (ii) a plurality of time correction fields each corresponding to a different one of the plurality of intermediate nodes. The method also includes identifying, at the device, (i) a time specified by the time stamp, and (ii) time correction information specified in the plurality of time correction fields, and using, at the device, the time correction information and the time specified by the time stamp to synchronize a clock maintained by the device to a clock maintained by the source node.

In another embodiment, a device includes one or more ports configured to receive packets from a network, and a time information identification unit configured to identify (i) a time specified by a time stamp of a packet received via at least one of the one or more ports, and (ii) time correction information specified in a plurality of time correction fields of the packet, where each of the plurality of time correction fields corresponds to a different one of a plurality of intermediate nodes in the network, and the time stamp was generated by a source node. The device also includes a time synchronization unit configured to use the time correction information and the time specified by the time stamp to synchronize a clock maintained by the device to a clock maintained by the source node.

DETAILED DESCRIPTION

Figure 1:
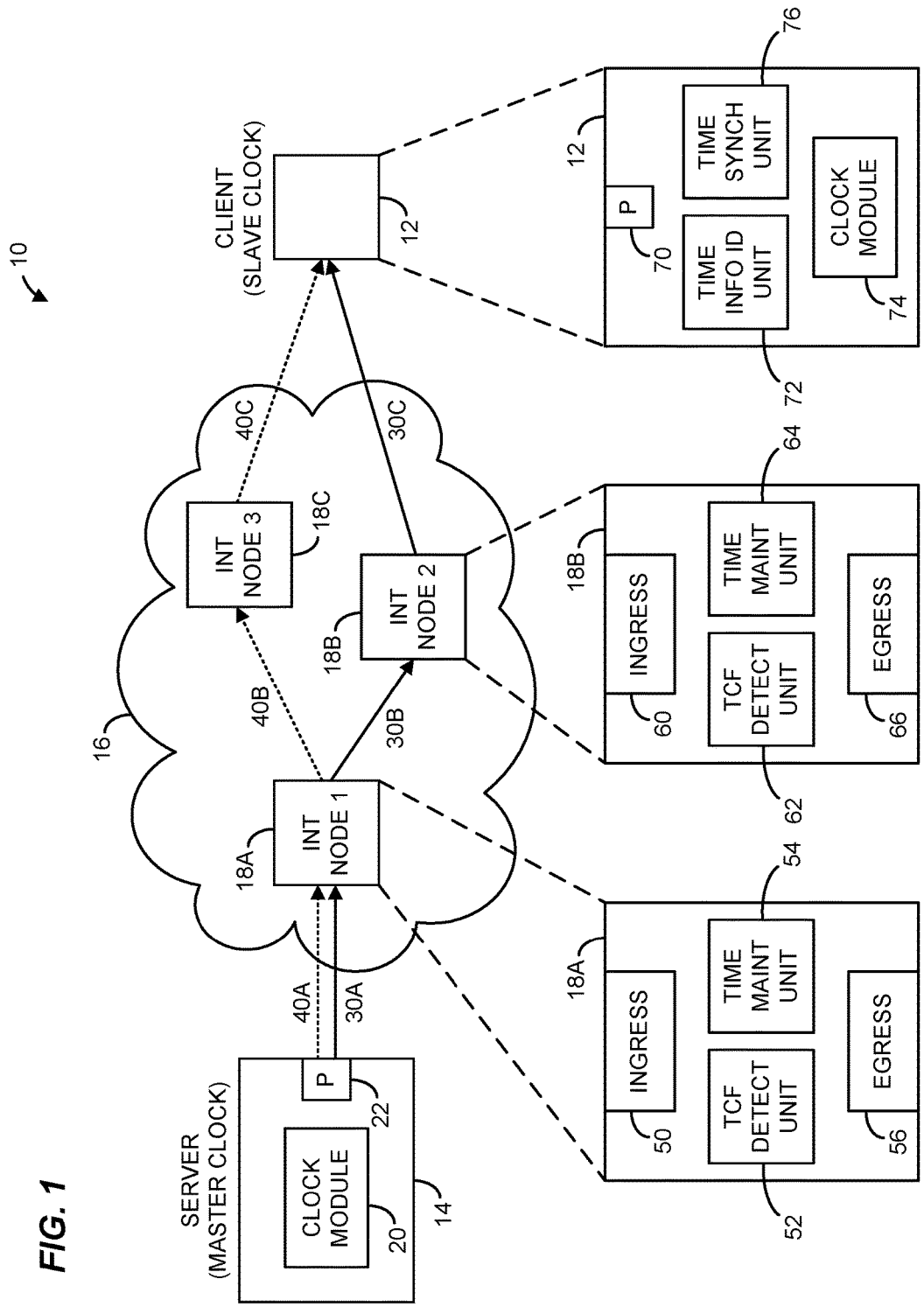
FIG. 1 is a block diagram of an example system in which a slave clock of a client is synchronized to a master clock of a server based on signals transmitted to the client from the server via a network that includes intermediate nodes, according to an embodiment.

In various embodiments described below, time and/or frequency at a slave/client device is synchronized to a master clock maintained by a master/server device using time protocol packets that are sent from the master device to the slave device via one or more intermediate nodes of a network. The time protocol packets are generated at the master device and include a time stamp that captures a time provided by the master clock, in an embodiment. In an embodiment, the time protocol packets are Network Time Protocol (NTP) packets.

In various embodiments and scenarios, at least one of the intermediate nodes in the network supports time correction functionality that allows the destination (slave) device to determine delays of time protocol packets within the intermediate node(s) of the network. In one such embodiment and scenario, one or more of the intermediate nodes processes the time protocol packets to determine whether the received time protocol packets already include an existing time correction field, and for each time protocol packet either updates the time correction field when such a field already exists, or adds a new time correction field if such a field does not yet exist. Additionally or alternatively, in some embodiments and scenarios, one or more of the intermediate nodes adds a new time correction field to each of the time protocol packets regardless of whether the received time protocol packets already include time correction fields. In some embodiments and scenarios, one or more of the intermediate nodes do not support time correction functionality, and neither add a new time correction field nor check whether received time protocol packets already include a time correction field.

In some embodiments in which the time protocol packets are NTP packets, the newly added (or updated) time correction fields are NTP "extension fields." NTP extension fields are general-purpose fields that can optionally be added at the end of an NTP packet. In other embodiments, the NTP extension fields are added at other, suitable locations in an NTP packet. These extension fields are generally defined by the NTP standard to include a "field type" sub-field indicating the specific purpose/function of the extension field, a "length" sub-field indicating the length of the extension field, a "value" sub-field that includes information corresponding to the indicated field type, and (if needed) padding bits. The NTP standard does not, however, define any particular use or application in which an extension field relates to time correction information. Indeed, conventional NTP systems typically use extension fields for entirely different purposes, such as authentication of the source of the NTP packets.

After receiving a time protocol packet that has traversed the intermediate nodes of the network, the slave device calculates a corrected time based on the time correction information included in the time correction field(s) and based on the time stamp (and, in some embodiments, based on one or more additional time stamps included in the time protocol packet), in an embodiment. In one embodiment, the time correction information in the time correction field(s) includes one or more "residence times" reflecting the length of time that the time protocol packet resided in (e.g., was processed and/or queued by) each of the intermediate nodes in the packet path that supports time correction functionality. The time correction information can then be used by the slave device to synchronize the slave clock to the master clock (e.g., by adjusting a time and/or frequency at the slave device).

FIG. 1 is a block diagram of a highly simplified example system 10 that includes a client 12 communicatively coupled to a server 14 via a network 16, according to an embodiment. While client 12 and server 14 are shown outside of (and coupled to) network 16, it is noted that client 12 and/or server 14 are considered to be included within the network 16, in an embodiment. Client 12 and server 14 are any suitable type(s) of devices (e.g., computing devices or component devices, network switches, etc.), according to various embodiments. Server 14 implements a master clock, while client 12 implements a slave clock. A clock module 20 of the server 20 is configured to maintain the master clock. In an embodiment, the master clock is a time-of-day clock. In another embodiment, the master clock is a counter not directly linked to a time-of-day. In an embodiment, the clock module 20 includes or utilizes a counter circuit (not seen in FIG. 1) that maintains the master clock. The clock module 20 is configured to cause time-stamped packets (also referred to herein as "time protocol packets") to be transmitted from server 14 to client 12 via a network 16. The time protocol packets are time-stamped with one or more values of the master clock maintained by the clock module 20, in an embodiment. In various embodiments, server 14 sends time protocol packets to client 12 on a periodic basis, upon request from client 12, or in another suitable manner.

The network 16 comprises one or more of a private network, a public network, a backbone network, a provider network, the Internet, etc. The network 16 includes a plurality of intermediate nodes 18A-18C. In various embodiments, the intermediate nodes 18A-18C are any suitable sort(s) of network device(s), such as routers, bridges, or other network switches. In the embodiment shown in FIG. 1 and described below, intermediate nodes 18A and 18B support at least some level of time correction functionality, while intermediate node 18C does not support any such time correction functionality. In alternative embodiments and/or scenarios, the network 16 includes more or fewer than the three intermediate nodes 18. Moreover, in alternative embodiments and/or scenarios, a different number of intermediate nodes 18 support time correction functionality. In some embodiments and/or scenarios, for example, all of intermediate nodes 18 in the network 16 support time correction functionality.

In an embodiment, the time protocol packet generated by clock module 20 and transmitted to the network 16 by server 14 does not include any time correction fields. In one embodiment, for example, the generated time protocol packet is an NTP packet conforming to the protocol specified by RFC 5905, with (as in conventional NTP systems) no extension fields being dedicated to time correction. Server 14 includes a port 22, and the clock module 20 is configured to cause the time protocol packet to be transmitted via at least the port 22. In an embodiment, port 22 is a physical port coupled to at least intermediate node 18A of network 16.

In some embodiments, the clock module 20 is implemented in whole or in part by one or more physical processors within server 14. In one such embodiment, some or all of the one or more physical processors are hardware processors, such as integrated circuits (e.g., application specific integrated circuits (ASICs), programmable logic devices, etc.) or a collection of discrete hardware components, for example. In another embodiment, some or all of the one or more physical processors are configured to read and execute software or firmware instructions stored on a tangible, non-transitory, computer-readable memory (e.g., a magnetic disk, optical disk, random access memory (RAM), read-only memory (ROM), flash memory, etc.). In some embodiments, the software or firmware instructions include machine-readable instructions that, when executed by the physical processor(s), cause the physical processor(s) to perform the actions described above.

Two paths of the time protocol packet, corresponding to two different example scenarios, are illustrated in FIG. 1. In the first path/scenario, the time protocol packet traverses path 30A-30C, which is represented in FIG. 1 by solid arrows. Thus, the time protocol packet passes through (e.g., is processed by, is queued by, etc.) intermediate nodes 18A and 18B before reaching client 12. In the embodiment of FIG. 1, the intermediate node 18A includes an ingress 50 configured to receive packets (including at least time protocol packets) from the server 14. In an embodiment, the ingress 50 includes at least one physical port coupled at least to server 14. A time correction field detection unit 52 of intermediate node 18A is configured to determine whether time protocol packets received via ingress 50 include time correction fields. As noted above, the time protocol packet generated and transmitted by server 14 does not, in some embodiments, include any time correction fields. In these embodiments, therefore, the time correction field detection unit 52 determines that no time correction field is included in each of the time protocol packets received from server 14. In response to each such determination, in an embodiment, a time maintenance unit 54 of intermediate node 18A adds a new time correction field to the respective time protocol packet. In some embodiments, the time maintenance unit 54 is configured to add a new time correction field to each time protocol packet regardless of whether any time correction fields already exist within the packet. In one such embodiment, the time correction field detection unit 52 is not included in intermediate node 18A.

Figure 2:
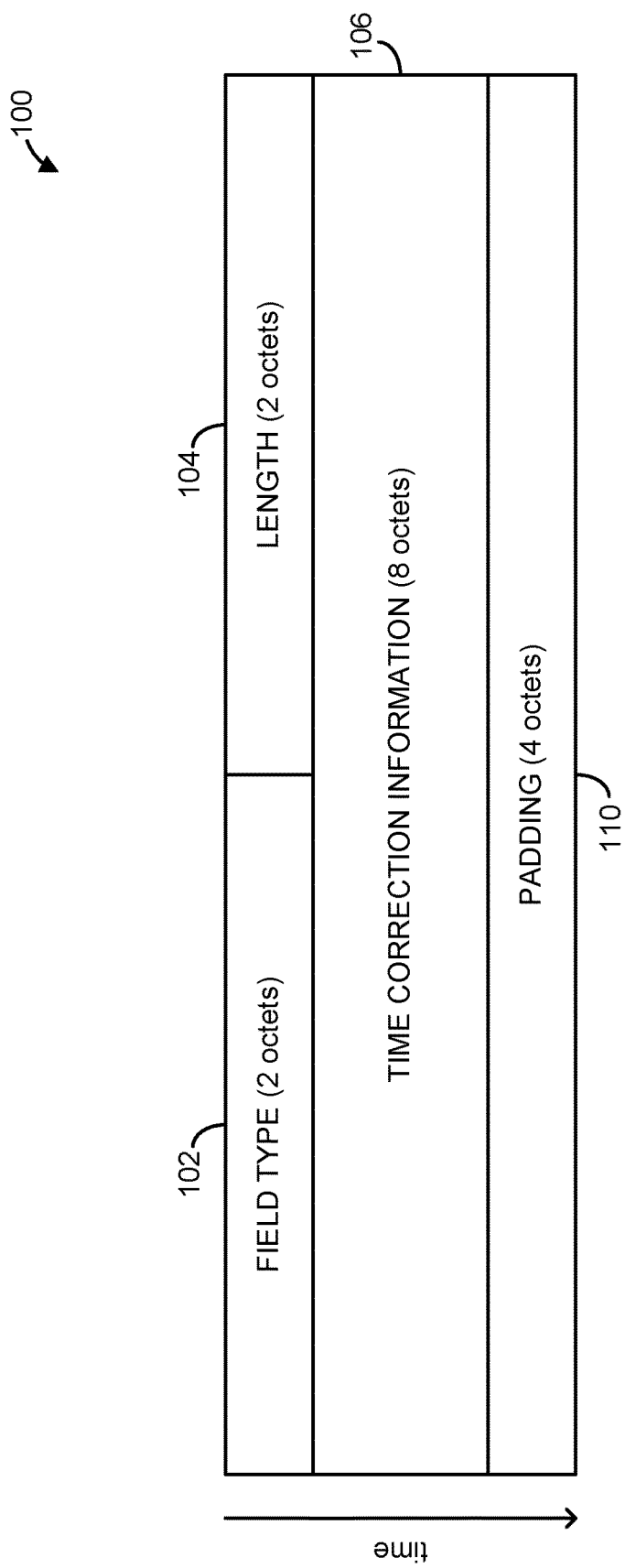
FIG. 2 is a diagram of an extension field used to support time correction functionality in a system such as the example system of FIG. 1, according to an embodiment.

In some embodiments in which the time protocol packet is an NTP packet, the time correction field added by time maintenance unit 54 is an extension field as defined by RFC 5095. FIG. 2 shows one embodiment of an example time correction field 100 that is generally arranged according the NTP extension field format. The time correction field 100 includes various sub-fields, including a "field type" sub-field 102, a "length" sub-field 104, a "time correction information" sub-field 106, and a "padding" sub-field 110. In the embodiment of FIG. 2, the field type sub-field 102 is two octets (16 bits) long, the length sub-field 104 is two octets long, the time correction information sub-field 106 is eight octets long, and the padding sub-field 110 is four octets long. In an embodiment, the field type sub-field 102 includes information specifying that the time correction field 100 is to be used for time correction purposes (e.g., at the destination device, client 12), the length sub-field 104 includes information specifying the length (e.g., bits, bytes, octets, etc.) of the time correction field 100, and the padding sub-field 110 includes padding bits (e.g., zeros or ones) as needed. In some embodiments, the time correction information 106 specifies a residence time of the time protocol packet within intermediate node 18A. The "residence time" generally refers to a length of time that the time protocol packet spends in intermediate node 18A before being forwarded to the next device in network 16 (i.e., in the first path/scenario, before being forwarded to intermediate node 18B). In one embodiment, for example, the residence time is a counter value, maintained by a counter (not seen in FIG. 1) of intermediate node 18A, that corresponds to a length of time that the time protocol packet spent within (e.g., was queued and/or processed by) intermediate node 18A. While FIG. 2 shows an extension field 100 arranged according to the NTP standard, the time correction field added by time maintenance unit 54 has a different, suitable format in other embodiments.

Figure 3A:
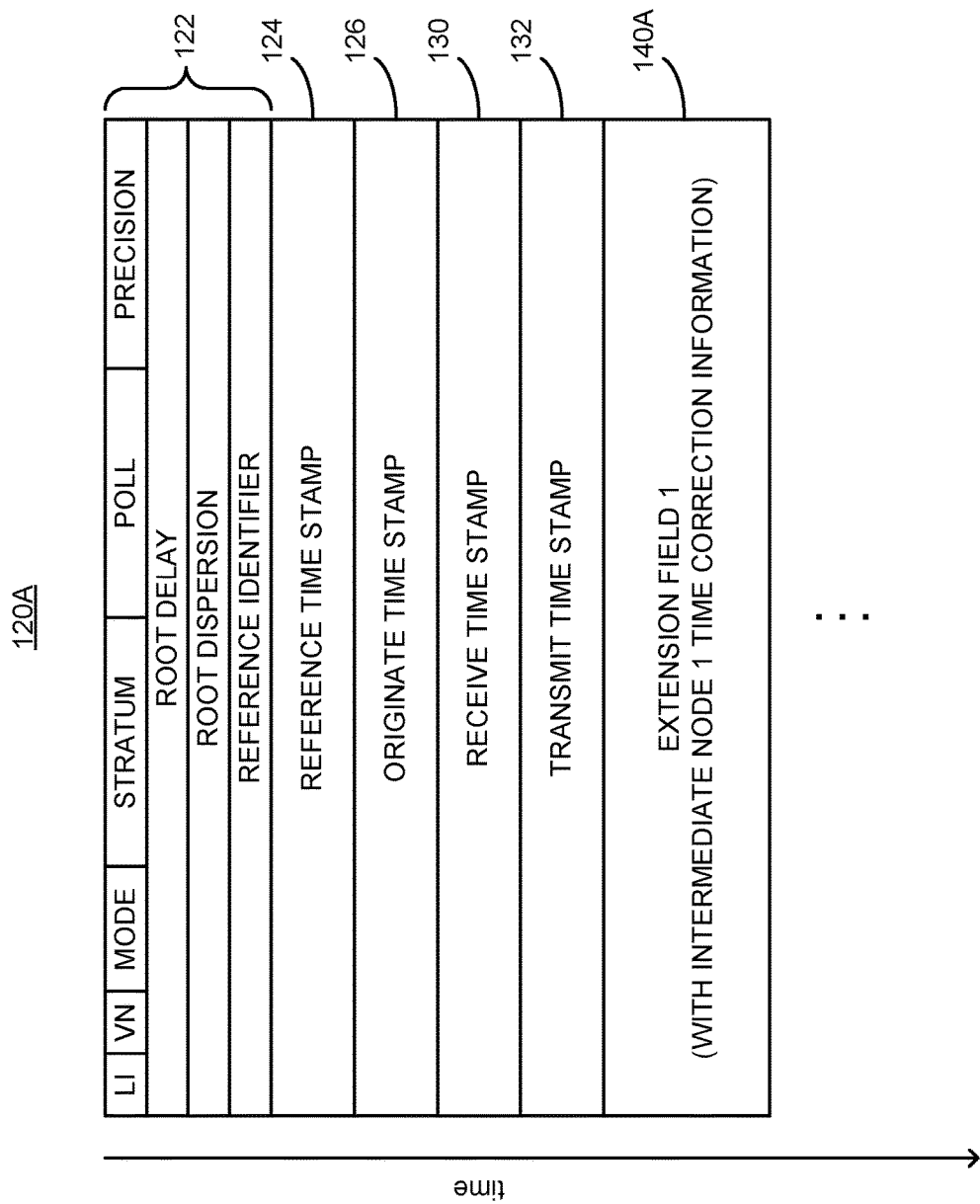
FIG. 3A is a diagram of a time protocol packet after processing by an intermediate node of a system such as the example system of FIG. 1, according to one embodiment and scenario.

FIG. 3A shows an example time protocol packet 120A, after processing by intermediate node 18A, that corresponds to one embodiment in which the time protocol packet 120A is an NTP packet. As seen in FIG. 3A, the time protocol packet 120A first includes various fields 122 that conform to the NTP standard, such as a "leap indicator" (LI) field, a "version number" (VN) field, a "mode" field, etc. Thereafter, and also in conformance with the NTP standard, the example time protocol packet 120A includes a "reference time stamp" 124 specifying the time at which the master clock was last set or corrected, an "originate time stamp" 126 specifying the time when client 12 sent server 14 a request for a time protocol packet, a "receive time stamp" 130 specifying the time when the request was received by server 14, and a "transmit time stamp" 132 specifying a time when the time protocol packet 120A was sent by server 14 in response to the request from client 12.

As seen in FIG. 3A, the time protocol packet 120A also includes a first extension field 140A. The first extension field 140A is the time correction field added by the time maintenance unit 54 of intermediate node 18A (e.g., time correction field 100 of FIG. 2), according to one embodiment. In some embodiments, the time protocol packet 120A also includes one or more additional fields after the first extension field 140A. In other embodiments, the time protocol packet 120A ends immediately after the first extension field 140A. In various alternative embodiments, the time maintenance unit 54 adds the first extension field 140A at a different, suitable location within the time protocol packet 120A.

Referring again to FIG. 1 and the first example scenario (path 30A-30C), the modified time protocol packet (e.g., time protocol packet 120A) is forwarded to intermediate node 18B via an egress 56. In an embodiment, the egress 56 includes at least one physical port coupled to at least intermediate node 18B (for the first path/scenario), or coupled to at least intermediate node 18C (for the second path/scenario). In one embodiment in which the time correction field includes information specifying a residence time of the time protocol packet within intermediate node 18A, the intermediate node 18A measures the residence time based on when the packet is first detected at ingress 50 and when the (modified) packet is transmitted by egress 56. While FIG. 1 depicts only ingress 50, time correction field detection unit 52, time maintenance unit 54, and egress 56 within intermediate node 18A, it is noted that in some embodiments intermediate node 18A includes one or more additional units or stages. In various embodiments, for example, intermediate node 18A is a router device that also includes policy and/or policer ingress engines, a router engine, policy and/or policer egress engines, etc. In some embodiments, the time correction field detection unit 52 and/or time maintenance unit 54 are included within another unit or engine, such as a media access control (MAC) engine or a header parsing engine.

In some embodiments, each of the time correction field detection unit 52 and/or the time maintenance unit 54 is implemented in whole or in part by a respective set of one or more physical processors within intermediate node 18A. In one such embodiment, some or all of the one or more physical processors are hardware processors, such as integrated circuits (e.g., ASICs, programmable logic devices, etc.) or a collection of discrete hardware components, for example. In another embodiment, some or all of the one or more physical processors are configured to read and execute software or firmware instructions stored on a tangible, non-transitory, computer-readable memory such as a magnetic disk, optical disk, RAM, ROM, flash memory, etc. In some embodiments, the software or firmware instructions include machine-readable instructions that, when executed by the physical processor(s), cause the physical processor(s) to perform the actions described above. In some embodiments, the same set of one or more physical processors implements the functionality of both the time correction field detection unit 52 and the time maintenance unit 54.

Figure 3B:
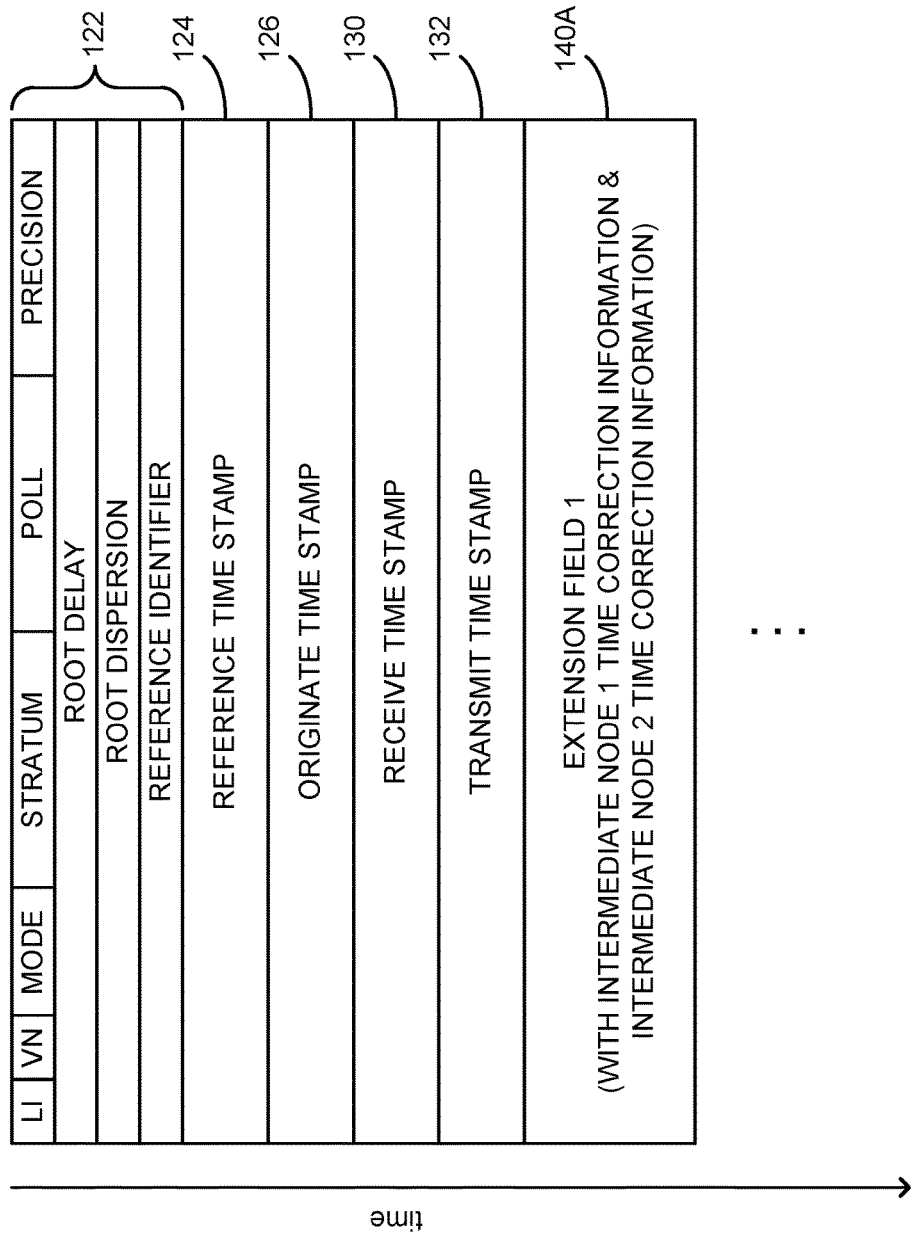
FIG. 3B is a diagram of a time protocol packet after processing by two intermediate nodes of a system such as the example system of FIG. 1, according to one embodiment and scenario.

Continuing with the first example scenario (path 30A-30C), an ingress 60 of intermediate node 18B receives the time protocol packet (now including a time correction field) from intermediate node 18A via path 30B. In an embodiment, the ingress 60 includes at least one physical port coupled to at least intermediate node 18A. The intermediate node 18B includes a time correction field detection unit 62 and a time maintenance unit 64, which in some embodiments are similar to the time correction field detection unit 52 and time maintenance unit 54, respectively, of intermediate node 18A. In one embodiment, the time correction field detection unit 62 detects the time correction field added by intermediate node 18A (e.g., the first extension field 140A of FIG. 3A). In response to this determination, in an embodiment, the time maintenance unit 64 updates the time correction field. In one embodiment where the intermediate node 18B receives the time protocol packet 120A from intermediate node 18A, for example, the time correction field detection unit 62 detects the extension field 140A, and the time maintenance unit 64 then updates the time correction information included in the extension field 140A. In various embodiments, the time maintenance unit 64 updates the time correction information in the extension field 140A by further specifying the residence time of the time protocol packet 120A in intermediate node 18B, or by changing the residence time added at intermediate node 18A such that the time reflects a total residence time of the time protocol packet 120A within intermediate nodes 18A and 18B. FIG. 3B shows a time protocol packet 120B that corresponds to the time protocol packet 120A after processing by the time maintenance unit 64 of intermediate node 18B, according to one such embodiment. As seen in FIG. 3B, the first extension field 140A has been modified to reflect not only the packet delay associated with intermediate node 18A, but also the packet delay associated with intermediate node 18B.

Figure 3C:
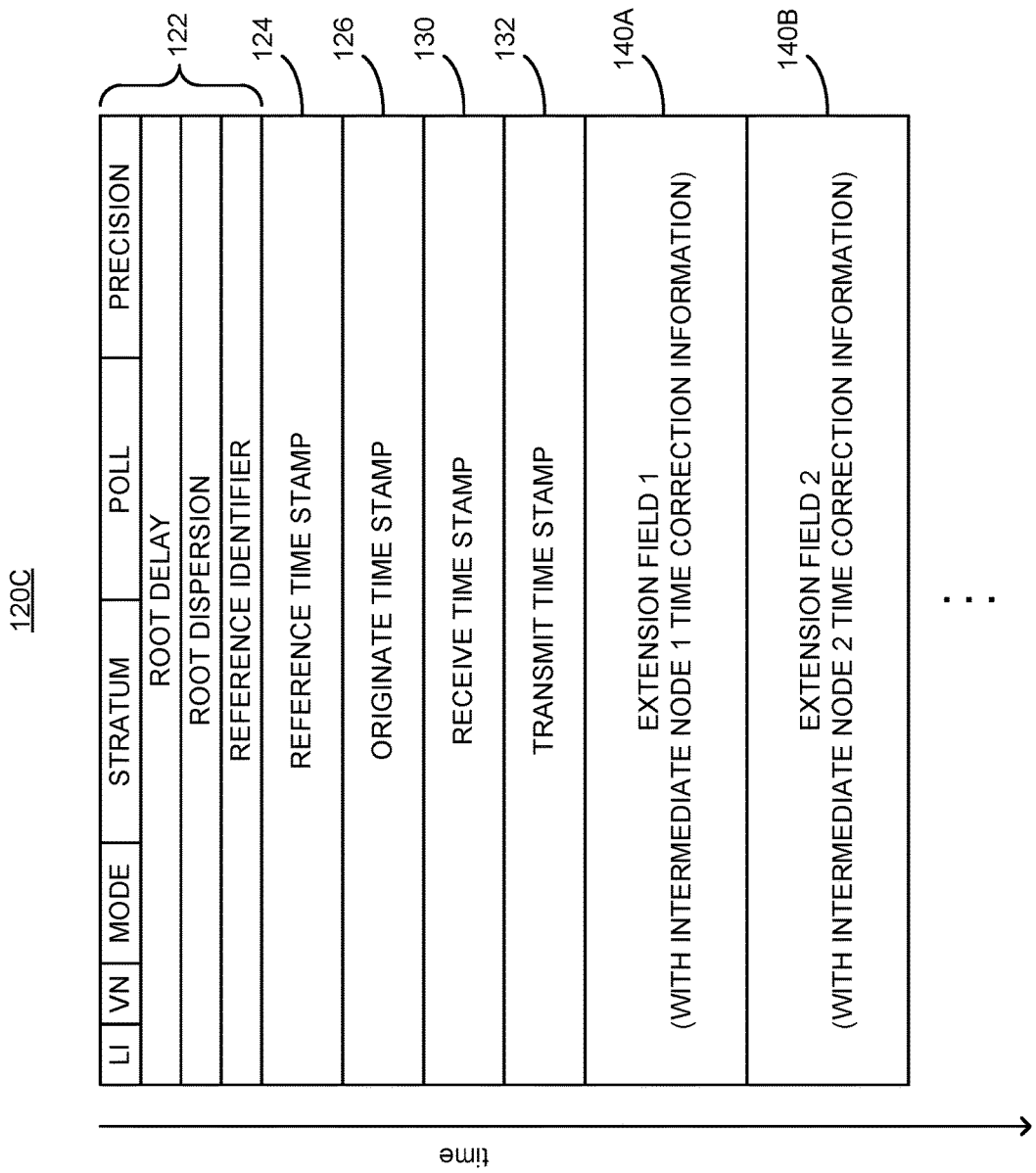
FIG. 3C is a diagram of a time protocol packet after processing by two intermediate nodes of a system such as the example system of FIG. 1, according to another embodiment and scenario.

Alternatively, in some embodiments, the time maintenance unit 64 adds a new time correction field specifying time correction information associated with intermediate node 18B (e.g., a residence time of the time protocol packet within intermediate node 18B), even though the time protocol packet already included such a field (i.e., extension field 140A) when received by intermediate node 18B. FIG. 3C shows a time protocol packet 120C that corresponds to the time protocol packet 120A after processing by the time maintenance unit 64 of intermediate node 18B, according to one such embodiment. As seen in FIG. 3C, the time protocol packet 120C includes not only the first extension field 140A added by intermediate node 18A, but also a new, second extension field 140B added by intermediate node 18B. In some embodiments, the second extension field 140B is arranged in a manner similar to the first extension field 140A (e.g., according to the format of extension field 100 in FIG. 2), but specifies a residence time of the time protocol packet within intermediate node 18B rather than intermediate node 18A. In other embodiments, the second extension field 140B is arranged according to a format different than the format of the first extension field 140A.

Referring again to FIG. 1 and the first example scenario (path 30A-30C), the modified time protocol packet (e.g., time protocol packet 120C) is forwarded to client 12 via an egress 66. In an embodiment, the egress 66 includes at least one physical port coupled to at least client 12. In some embodiments in which the time correction information added by intermediate node 18B specifies a residence time of the time protocol packet within intermediate node 18B, the intermediate node 18B measures the residence time based on when the packet is first detected at ingress 60 and when the (modified) packet is transmitted by egress 66. While FIG. 1 depicts only ingress 60, time correction field detection unit 62, time maintenance unit 64, and egress 66 within intermediate node 18B, it is understood that in some embodiments intermediate node 18B includes one or more additional units or stages. In various embodiments, for example, intermediate node 18B is a router device that includes a policy and/or policer ingress engines, a router engine, policy and/or policer egress engines, etc. In some embodiments, the time correction field detection unit 62 and/or time maintenance unit 64 are included within another unit or engine, such as a MAC engine or a header parsing engine. Moreover, in some embodiments where the intermediate node 18B adds a new time correction field regardless of whether such a field already exists, intermediate node 18B does not include the time correction field detection unit 62.

In some embodiments, each of the time correction field detection unit 62 and/or the time maintenance unit 64 is implemented in whole or in part by a respective set of one or more physical processors within intermediate node 18B. In one such embodiment, some or all of the one or more physical processors are hardware processors, such as integrated circuits (e.g., ASICs, programmable logic devices, etc.) or a collection of discrete hardware components, for example. In another embodiment, some or all of the one or more physical processors are configured to read and execute software or firmware instructions stored on a tangible, non-transitory, computer-readable memory such as a magnetic disk, optical disk, RAM, ROM, flash memory, etc. In some embodiments, the software or firmware instructions include machine-readable instructions that, when executed by the physical processor(s), cause the physical processor(s) to perform the actions described above. In some embodiments, the same set of one or more physical processors implements the functionality of both the time correction field detection unit 62 and the time maintenance unit 64.

In the second example scenario, the time protocol packet instead traverses path 40A-40C, which is represented in FIG. 1 by dashed arrows. Thus, the time protocol packet passes through (e.g., is processed by, queued by, etc.) intermediate nodes 18A and 18C before reaching client 12. In the second path/scenario, the time protocol packet is processed by intermediate node 18A in the same manner described above with respect to the first path/scenario (e.g., resulting in time protocol packet 120A, in one embodiment). As noted above, however, the intermediate node 18C does not, in the example embodiment and scenario of FIG. 1, support time correction functionality. Thus, in one such embodiment, the intermediate node 18C does not add any time correction information to the time protocol packet, and does not modify any time correction information already existing within the time protocol packet as received by intermediate node 18C. Instead, the intermediate node 18C processes the time protocol packet only according to other functionality of the intermediate node 18C (e.g., using a policy engine, forwarding engine, etc.), before forwarding the time protocol packet to client 12. In one embodiment and scenario, for example, intermediate node 18C receives time protocol packet 120A from intermediate node 18A, and forwards the time protocol packet 120A to client 12 without adding a new time correction field or updating the existing time correction field (extension field 140A).

In both the first and second example scenarios, the time protocol packet is received by the client 12, via a port 70, after having traversed network 16 via path 30A-30C or path 40A-40C. In an embodiment, the port 70 is a physical port coupled at least to intermediate node 18B (for the first example path/scenario) or at least to intermediate node 18C (for the second example path/scenario). In some embodiments, the client 12 includes one or more additional ports not seen in FIG. 1. A time information identification unit 72 in client 12 is configured to identify the time specified by a time stamp in the received time protocol packet. In some embodiments, the time information identification unit 72 identifies times specified in a plurality of time stamps. In some embodiments and scenarios in which the time protocol packet 120A, the time protocol packet 120B, or the time protocol packet 120C is received by client 12, for example, the time information identification unit 72 identifies the times specified by each of the reference time stamp 124, the originate time stamp 126, the receive time stamp 130, and the transmit time stamp 132. In some embodiments, the time information identification unit 72 identifies the time(s) specified in the time stamp(s) by parsing data, within the time protocol packet, that is located at a predetermined time stamp location, or locations, within the time protocol packet.

The time information identification unit 72 also identifies time correction information specified in one or more time correction fields of the time protocol packet, in an embodiment. In some embodiments and scenarios where the time protocol packet 120A, the time protocol packet 120B, or the time protocol packet 120C is received by client 12, for example, the time information identification unit 72 identifies the time correction information specified by the first extension field 140A and (if present) the second extension field 140B. In some embodiments, the time information identification unit 72 first determines whether any time correction fields exist within the packet, and then reads values within any time correction fields that are determined to exist.

Client 12 also includes a clock module 74 configured to maintain the slave clock. A time synchronization unit 76 in client 12 is configured to utilize the time(s) specified in the time stamp(s), and the time correction information, as identified by the time information identification unit 72, to synchronize the slave clock with the master clock maintained by server 14. In various embodiments and/or scenarios, the time synchronization unit 76 synchronizes the slave clock by adjusting a frequency of the slave clock to match a frequency of the master clock, and/or by adjusting a time of the slave clock to match a time of the master clock. In one embodiment in which the time correction information includes one or more residence times (e.g., corresponding to one or more respective intermediate nodes), the time synchronization unit 76 reads each of the residence times, and sums the residence times together to determine a total delay along the path 30A-30C (in the first example scenario) or the path 40A-40C (in the second example scenario).

Operation of the time synchronization unit 76 is now described in more detail with respect to one example embodiment and scenario. In this example embodiment and scenario, server 14 generates an NTP packet that includes at least a transmit time stamp "T1" specifying a time when the NTP packet was sent by server 14, a receive time stamp "T2" specifying a time when a request for the NTP packet was received from client 12 by server 14, and an origin time stamp "T3" specifying a time when client 12 sent the request for the NTP packet to server 14. In this example embodiment and scenario, the NTP packet traverses at least intermediate node 18A to reach client 12, and as a result the NTP packet includes at least one NTP extension field containing data indicative of at least one intermediate node residence time.

Continuing with this example, after client 12 receives the NTP packet, client 12 is aware of the times specified by time stamps T1, T2 and T3, the time ("T4") at which the NTP packet was received by client 12, and the residence time(s) specified in the NTP extension field(s). In one embodiment, the time synchronization unit 76 then computes a time offset between server 14 and client 12 as follows:

$$\text{Offset}=T4-T3-CF-0.5*\text{RTT} \qquad \text{(Equation 1)}$$

In Equation 1, CF is the sum of all residence times indicated in the one or more NTP extension fields of the NTP packet received by client 12. RTT is the round-trip time between client 12 and server 14, which in an embodiment is calculated by the time synchronization unit 76 as:

$$\text{RTT}=0.5*[(T4-T3-CF)+(T2-T1)] \qquad \text{(Equation 2)}$$

The offset and round-trip times are important values that can be used according to the NTP protocol to synchronize the clock of client 12 to the master clock of server 14. In some embodiments and scenarios, client 12 generates time stamps to be inserted into the next NTP message for transmission. In one embodiment, for example, client 12 sets the transmit time stamp equal to T3, sets the receive time stamp equal to (T4-CF), and sets the origin time stamp to the precise time when the NTP message is transmitted.

In some embodiments, each of the time information identification unit 72, the time synchronization unit 76, and/or the clock module 74 is implemented in whole or in part by a respective set of one or more physical processors within client 12. In one such embodiment, some or all of the one or more physical processors are hardware processors, such as integrated circuits (e.g., ASICs, programmable logic devices, etc.) or a collection of discrete hardware components, for example. In another embodiment, some or all of the one or more physical processors are configured to read and execute software or firmware instructions stored on a tangible, non-transitory, computer-readable memory such as a magnetic disk, optical disk, RAM, ROM, flash memory, etc. In some embodiments, the software or firmware instructions include machine-readable instructions that, when executed by the physical processor(s), cause the physical processor(s) to perform the actions described above. In some embodiments, the same set of one or more physical processors implements the functionality of two or more of the time information identification unit 72, time synchronization unit 76, and clock module 74.

Figure 4:
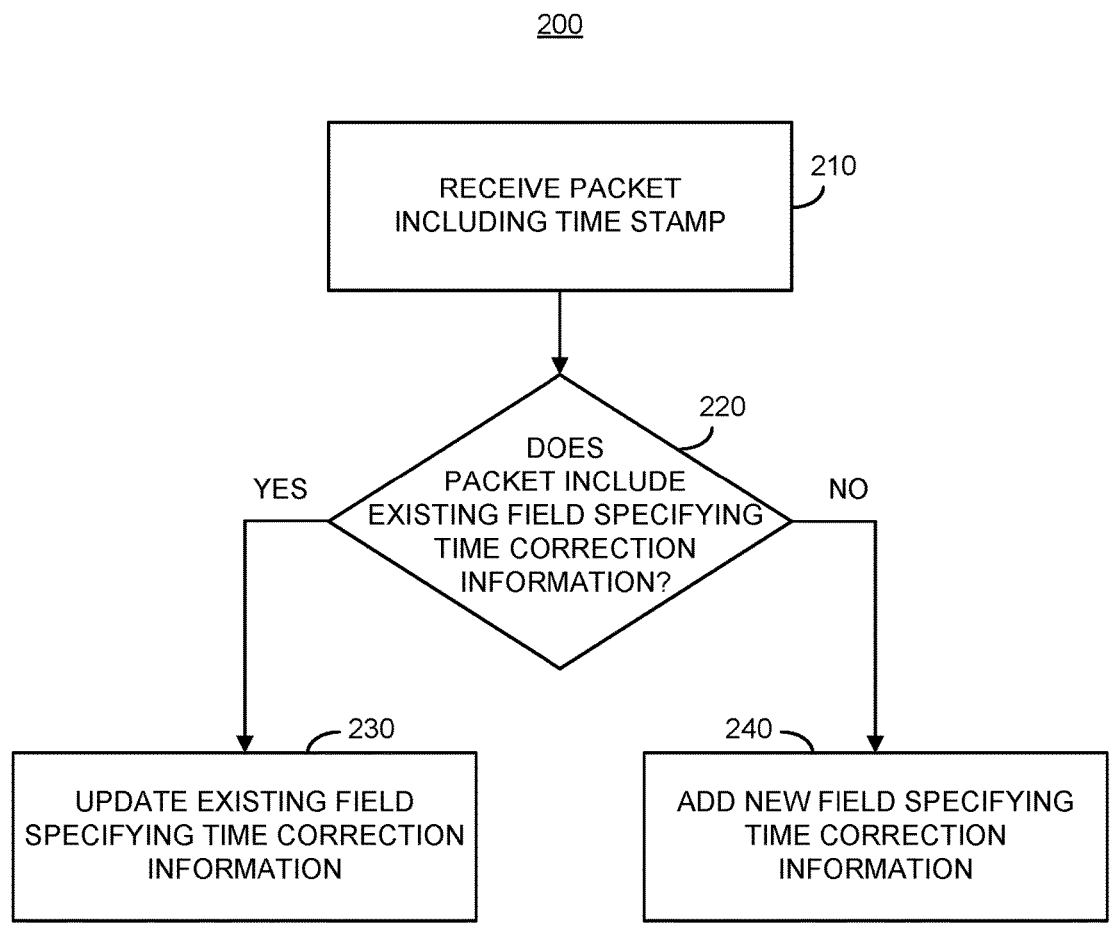
FIG. 4 is a flow diagram of an example method for maintaining time at a network device acting as an intermediate node, according to an embodiment.

FIG. 4 is a flow diagram of an example method 200 for maintaining time at a network device acting as an intermediate node, according to an embodiment. In various embodiments and scenarios, the method 200 is implemented by intermediate node 18A or intermediate node 18B of FIG. 1.

At block 210, a packet including a time stamp is received. The packet conforms to a protocol that does not define a dedicated field for time correction, and the time stamp specifies a time (e.g., a transmit time generated by a master clock), in an embodiment. In some embodiments, for example, the packet is an NTP packet or other suitable timing packet. The received packet does not include any fields carrying, or any fields dedicated to the purpose of carrying, time correction information (e.g., residence times), in an embodiment. In some embodiments, the received packet includes a plurality of time stamps (e.g., four time stamps of an NTP packet). In one embodiment, block 210 is implemented by an ingress such as ingress 50 or ingress 60 of FIG. 1.

At block 220, it is determined whether the packet received at block 210 includes an existing field specifying time correction information, i.e., whether the packet, when received by the network device, includes a field to be used for correcting a time specified by the time stamp in the packet received at block 210 (e.g., according to the example corresponding to Equation 1 and/or Equation 2 above, in an embodiment). In some embodiments, for example, it is determined whether the packet includes an existing field specifying one or more residence times of the packet in one or more respective intermediate nodes of the network. In one embodiment in which the packet received at block 210 is an NTP packet, it is determined whether the NTP packet includes an NTP extension field such as extension field 100 of FIG. 2 (e.g., an extension field having at least a sub-field specifying a "field type" that designates the NTP extension field as a field that specifies time correction information), for example. In some embodiments, determining whether a time correction field already exists includes determining the total number N of time correction fields (e.g., the number of NTP extension fields including time correction information), with N=0 corresponding to a determination that no time correction fields are present in the packet. In one embodiment, block 220 is implemented by a time correction field detection unit such as time correction field detection unit 52 or time correction field detection unit 62 of FIG. 1.

If it is determined at block 220 that the packet received at block 210 includes an existing field specifying time correction information (e.g., if N>0), flow proceeds to block 230. At block 230, the existing field detected at block 220 is updated. In an embodiment, the existing field is updated to reflect a residence time of the packet in the network device implementing the method 200 (e.g., the amount of time that the network device processes and/or queues the packet, in an embodiment). In one embodiment in which the existing field is an NTP extension field arranged in the manner of extension field 100 of FIG. 2, for example, the value of sub-field 106 is updated to reflect the residence time. In some embodiments, the packet received at block 210 includes a single time correction field that specifies a sum total of one or more residence times corresponding to one or more intermediate nodes in the packet path (prior to reaching the network device implementing the method 200), and the field is updated at block 230 by adding the residence time of the packet within the network device implementing the method 200 to that sum total. In other embodiments, the packet received at block 210 includes a single time correction field that specifies one or more distinct residence times corresponding to one or more respective intermediate nodes in the packet path (prior to reaching the network device implementing the method 200), and the field is updated at block 230 by adding additional information specifying the residence time of the packet within the network device implementing the method 200. In still other embodiments, the packet received at block 210 includes a plurality of time correction fields that each specify one or more distinct residence times, or that each specify a sum total of one or more residence times, and a single one of the multiple fields is updated at block 230 either by adding additional information specifying the residence time of the packet within the network device implementing the method 200, or by instead adding the residence time to a sum total within one of the fields. In an alternative embodiment, a new field specifying additional time correction information (e.g., any of the types of time correction information discussed above in connection with block 230, such as a residence time) is added to the packet at block 230, despite having determined that a time correction field already exists within the packet at block 220. In one embodiment, block 230 is implemented by a time maintenance unit such as, for example, time maintenance unit 54 or time maintenance unit 64 of FIG. 1.

If it is instead determined at block 220 that the packet received at block 210 does not include an existing field specifying time correction information, flow proceeds to block 240. At block 240, because no existing field in the packet is suitable for updating with additional time correction information, a new field specifying time correction information (i.e., a new field specifying information to be used for correcting the time specified by the time stamp) is added to the packet. In one embodiment in which it is determined at block 220 whether the packet includes an existing field specifying one or more residence times of the packet in one or more respective intermediate nodes of a network, for example, the new field specifies a residence time of the packet within the network device implementing the method 200 (e.g., the amount of time that the network device processes and/or queues the packet, in an embodiment). In one embodiment in which the packet received at block 210 is an NTP packet, the new field is an NTP extension field such as extension field 100 of FIG. 2 (e.g., an extension field having at least a first sub-field specifying a "field type" that designates the extension field as a field specifying time correction information, and a second sub-field that specifies the time correction information itself), for example. In one embodiment, block 240 is implemented by a time maintenance unit such as time maintenance unit 54 or time maintenance unit 64 of FIG. 1 (e.g., the same time maintenance unit that implements block 230, in an embodiment).

In some embodiments, the method 200 includes one or more additional blocks not seen in FIG. 4. In one embodiment, for example, the method 200 includes an additional block, after each of block 230 and block 240, in which the packet (including the field updated at block 230 or the field added at block 240) is forwarded to another network device. In one embodiment, such a block is implemented by an egress such as ingress 56 or egress 66 of FIG. 1. In some scenarios, the method 200 is repeated for each of a plurality of packets received by the network device that implements the method 200. In one embodiment and scenario, for example, a first packet (e.g., a first NTP packet) is received at block 210, is determined to not include an existing field specifying time correction information at block 220, and is modified to include a new field specifying such a field (e.g., an NTP extension field such as extension field 100) at block 240, while a second packet (e.g., a second NTP packet) is received at block 210, is determined to include an existing field specifying time correction information (e.g., an NTP extension field such as extension field 100) at block 220, and is modified such that the existing field is updated to reflect a residence time of the second packet within the network device at block 230.

In an alternative embodiment, blocks 220 and 230 are excluded from method 200, and a new field specifying time correction information is added at block 240 regardless of whether the packet received at block 210 already includes a similar field. Moreover, in some embodiments and/or scenarios, a system such as system 10 of FIG. 1 includes multiple network devices that each function as an intermediate node in the packet path, but have differing levels of time correction functionality. In one embodiment and scenario, for example, a first intermediate node is configured to implement the full method 200 shown in FIG. 4, while a second intermediate node (located before or after the first intermediate node in the packet path) with more limited time correction functionality is configured to implement a method that includes blocks 210 and 240 but omits blocks 220 and 230. Additionally, in one embodiment and scenario, a third intermediate node (located before, between, or after the first and second intermediate nodes in the packet path) does not include any time correction functionality, and is unable to implement any of blocks 220, 230, and 240. By allowing intermediate nodes to implement differing levels of time correction functionality in this manner, system design requirements are relaxed.

Figure 5:
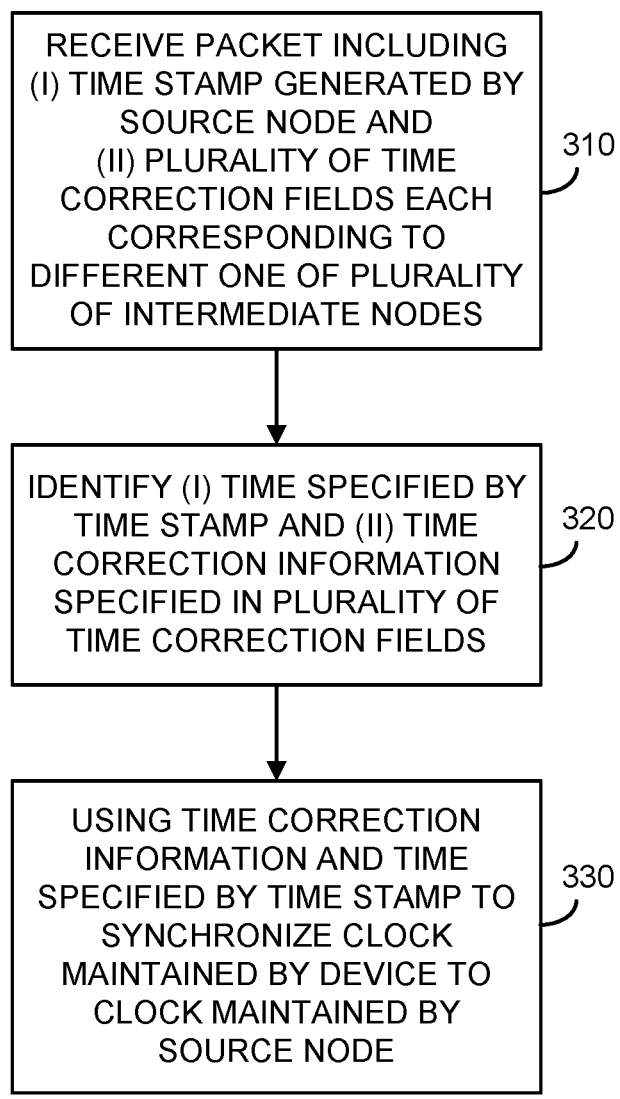
FIG. 5 is a flow diagram of an example method for synchronizing a slave clock maintained at a network device coupled to a network that includes a plurality of intermediate nodes, according to an embodiment.

FIG. 5 is a flow diagram of an example method 300 for synchronizing a slave clock maintained at a device coupled to a network that includes a plurality of intermediate nodes, according to an embodiment. In one embodiment, the method 300 is implemented by client 12 of FIG. 1.

At block 310, a packet that includes a time stamp and a plurality of time correction fields is received. The time stamp is a time stamp that was generated by a source node (e.g., a master device that generated the packet, in an embodiment), and each of the plurality of time correction fields corresponds to a different one of a plurality of intermediate nodes located in the packet path prior to the packet being received at block 310. In an embodiment, the packet is a packet that conforms to a protocol that does not define a dedicated field for time correction, such as NTP, for example. In an embodiment, the packet received at block 310 is an NTP packet that includes a plurality of time stamps and a plurality of NTP extension fields (e.g., NTP packet 120C of FIG. 3C, in an embodiment, with NTP extension fields 140A and 140B specifying at least the respective residence times of the intermediate nodes that added those extension fields). In one embodiment, the packet is received at block 310 by a port such as port 70 of FIG. 1.

At block 320, a time specified by the time stamp, and time correction information specified in the plurality of time correction fields, are identified. As noted above in connection with block 310, the time correction information identified at block 320 includes, in some embodiments, a plurality of residence times each associated with a different one of a plurality of intermediate nodes that was in the packet path prior to the packet being received at block 310. In one embodiment, block 320 is implemented by a time information identification unit such as time information identification unit 72 of FIG. 1.

At block 330, the time and the time correction information identified at block 320 are used to synchronize a clock (i.e., a slave clock) maintained by the device implementing the method 300 to a clock (i.e., a master clock) maintained by the source node that generated the time stamp. In one embodiment, for example, the time and the time correction information are used to synchronize the clocks by adjusting a time associated with the slave clock. Alternatively, or additionally, in an embodiment, the time and the time correction information are used to synchronize the clocks by adjusting a frequency associated with the slave clock. In one embodiment, block 330 is implemented by a time synchronization unit such as time synchronization unit 76 of FIG. 1.

While various embodiments have been described with reference to specific examples, which are intended to be illustrative only and not to be limiting, changes, additions and/or deletions may be made to the disclosed embodiments without departing from the scope of the claims.

What is claimed is:

1. A method for maintaining time at a network device, the method comprising:
   receiving, at the network device, a packet that conforms to a protocol that i) defines a time stamp field, ii) does not define a dedicated field for time correction information, and iii) defines a plurality of general purpose extension fields, wherein the packet includes a time stamp generated by a source node in the time stamp field;
   determining, at the network device, that the packet conforms to the protocol; and
   adding to the packet, at the network device, a new general purpose extension field, the new general purpose extension field specifying time correction information indicating a residence time of the packet in the network device, the time correction information to be used for correcting the time specified by the time stamp.

2. The method of claim 1, wherein the time correction information specified by the new general purpose extension field specifies a residence time of the packet only in the network device and not in any other network devices.

3. The method of claim 1, wherein receiving a packet includes receiving a Network Time Protocol (NTP) packet.

4. The method of claim 3, wherein:
   adding to the packet the new general purpose extension field specifying time correction information includes adding to the NTP packet a new NTP extension field that indicates a residence time of the NTP packet in the network device.

5. The method of claim 1, wherein adding to the packet new general purpose extension field includes adding a new general purpose extension field specifying (i) the time correction information and (ii) field type information designating the new general purpose extension field as a field that specifies time correction information.

6. The method of claim 1, wherein:
   adding the new general purpose extension field is performed regardless of whether packet already includes one or more general purpose extension fields specifying time correction information.

7. The method of claim 1, further comprising:
   forwarding the packet with the new general purpose extension field to another network device.

8. A network device comprising:
   an ingress configured to receive packets from a network;
   one or more physical processors configured to
      determine that a packet received via the ingress conforms to a protocol that i) defines a time stamp field, ii) does not define a dedicated field for time correction information, and iii) defines a plurality of general purpose extension fields, and
      add to the packet that conforms to the protocol a new general purpose extension field, the new general purpose extension field specifying time correction information indicating a residence time of the packet in the network device, the time correction information to be used for correcting the time specified by the time stamp.

9. The network device of claim 8, wherein the one or more physical processors are configured to specify, in the new general purpose extension field, time correction information that specifies a residence time of the packet only in the network device and not in any other network devices.

10. The network device of claim 8, wherein the packet is a Network Time Protocol (NTP) packet.

11. The method of claim 10, wherein the one or more physical processors are configured to:
add to the NTP packet a new NTP extension field specifying a residence time of the NTP packet in the network device.

12. The network device of claim 8, wherein the one or more physical processors are configured to:
add a new general purpose extension field that specifies (a) the time correction information and (b) field type information designating the new general purpose extension field as a field that specifies time correction information.

13. The network device of claim 8, wherein the one or more physical processors are configured to:
add the new general purpose extension field regardless of whether packet already includes one or more general purpose extension fields specifying time correction information.

14. The network device of claim 8, further comprising:
an egress configured to forward the packet with the new field, or with the updated existing field, to another network device.

15. A method for maintaining time at a network device, the method comprising:
receiving, at the network device, a first packet that conforms to a protocol that i) defines a time stamp field, ii) does not define a dedicated field for time correction information, and iii) defines a plurality of general purpose extension fields, wherein the first packet includes a first time stamp in the time stamp field;
determining, at the network device, that the first packet conforms to the protocol;
adding to the first packet, at the network device, a first new general purpose extension field, the first new general purpose extension field specifying first time correction information indicating a residence time of the first packet in the network device, the first time correction information to be used for correcting a time specified by the first time stamp;
receiving, at the network device, a second packet that conforms to the protocol, wherein the second packet includes a second time stamp in a time stamp field of the second packet;
determining, at the network device, that the second packet conforms to the protocol;
determining, at the network device, that the second packet includes an existing general purpose extension field having second time correction information; and
in response to determining that the second packet includes the existing general purpose extension field having second time correction information, one of:
(i) updating, at the network device, the second time correction information in the existing general purpose extension field of the second packet to reflect a residence time of the second packet in the network device, or
(ii) adding to the second packet, at the network device, a second new general purpose extension field to the second packet, the second new general purpose extension field specifying third time correction information indicating a residence time of the second packet in the network device, the third time correction information to be used for correcting a time specified by the second time stamp.

16. The method of claim 15, comprising:
in response to determining that the second packet includes the existing general purpose extension field having second time correction information, updating, at the network device, the second time correction information in the existing general purpose extension field of the second packet to reflect the residence time of the second packet in the network device.

17. The method of claim 15, wherein:
the first packet is a first Network Time Protocol (NTP) packet;
the second packet is a second NTP packet; and
determining that the second packet includes the general purpose extension field having second time correction information includes determining that the second NTP packet includes an NTP extension field containing data designating the NTP extension field as a field that specifies time correction information.

18. The method of claim 15, further comprising:
forwarding the first packet to a first other network device; and
forwarding the second packet to the first other network device or a second other network device.

19. A network device comprising:
an ingress configured to receive packets from a network;
one or more physical processors configured to
determine that a first packet received via the ingress conforms to a protocol that i) defines a time stamp field, ii) does not define a dedicated field for time correction information, and iii) defines a plurality of general purpose extension fields, wherein the first packet includes a first time stamp in the time stamp field,
add to the first packet a first new general purpose extension field, the first new general purpose extension field specifying first time correction information indicating a residence time of the first packet in the network device, the first time correction information to be used for correcting a time specified by the first time stamp,
determine that a second packet received via the ingress conforms to the protocol,
determine that the second packet includes an existing general purpose extension field having second time correction information, and
in response to determining that the second packet includes the existing general purpose extension field having second time correction information, one of:
(i) update the second time correction information in the existing general purpose extension field of the second packet to reflect a residence time of the second packet in the network device, or
(ii) add to the second packet a second new general purpose extension field to the second packet, the second new general purpose extension field specifying third time correction information indicating a residence time of the second packet in the network device, the third time correction information to be used for correcting a time specified by the second time stamp.

20. The network device of claim 19, wherein the one or more physical processors are configured to:
in response to determining that the second packet includes the existing general purpose extension field having second time correction information, update the second time correction information in the existing general purpose extension field of the second packet to reflect the residence time of the second packet in the network device.

21. The network device of claim 19, wherein:
the first packet is a first Network Time Protocol (NTP) packet;
the second packet is a second NTP packet; and
the one or more physical processors are configured to determine that the second NTP packet includes an NTP extension field containing data designating the NTP extension field as a field that specifies time correction information.

22. The network device of claim 19, further comprising an egress configured to:
forward the first packet to a first other network device; and
forward the second packet to the first other network device or a second other network device.

\* \* \* \* \*